Dec. 25, 1934. J. STANITZ 1,985,525
BRAKE DRUM
Filed Aug. 3, 1934

Inventor
Jacques Stanitz
By Frease and Bishop
Attorneys

Patented Dec. 25, 1934

1,985,525

UNITED STATES PATENT OFFICE 1,985,525

BRAKE DRUM

Jacques Stanitz, Warren, Ohio, assignor to The Youngstown Pressed Steel Company, Warren, Ohio, a corporation of Ohio Application August 3, 1934, Serial No. 738,261

5 Claims. (Cl. 188—218)

The invention relates to brake drums and more particularly to a one-piece sheet metal brake drum for use in the brakes of motor vehicles such as automobiles, trucks, busses and the like.

The increasingly severe demands which are being imposed upon motor vehicle brakes causes overheating of brake drums with a consequent distortion out of round, bell-mouthing and barrel-shaping of the usual types of brake drums.

Many different constructions have been proposed in attempts to overcome these difficulties. One of such constructions includes in a sheet metal brake drum, a rib having wide side walls extending transversely of the drum flange and integral with the flange and web for reinforcing the drum and preventing chattering. However, this construction does not prevent overheating, bell-mouthing, barrel-shaping and distortion of the braking flange out of round, so that at the most it merely provides a usual means of reinforcing cup-shaped articles.

Other proposed constructions have included a sheet metal shell in which one or more shallow and/or hollow ribs are formed in the braking flange thereof, and in which shell a lining member is cast extending within the hollow ribs thereof, or in which shell a metal liner band is welded, gripped, wedge-fitted or otherwise secured. While such constructions are perhaps more rigid than prior one-piece sheet metal brake drums, and accordingly minimize the bell-mouthing, barrel-shaping and distortion out of round difficulties, they do not eliminate overheating, which is primarily the cause of the other difficulties.

Moreover, by including an additional liner member, such constructions are quite expensive to manufacture, and are substantially heavier than one-piece sheet metal brake drums. This additional weight, present in brake drums on front wheels of motor vehicles, particularly of the knee action type, materially increases the difficulties encountered in providing a satisfactory steering gear.

Thus, all of the constructions heretofore proposed in attempts to overcome the characteristic brake drum difficulties, fail to take into account the fact that all of the difficulties and defects occur because of overheating.

It is therefore an object of the present invention to provide a one-piece sheet metal brake drum in which overheating is substantially prevented by providing means for rapidly dissipating the heat generated by severe braking loads.

It is a further object of the present invention to provide a one-piece sheet metal brake drum in which the means provided for preventing overheating so reinforces the drum that it has such extreme rigidity that barrel-shaping, bell-mouthing and distortion out of round cannot occur.

Moreover, it is an object of the present invention to provide a reinforced brake drum which will not overheat, and which may be made easily and economically by usual pressing or stamping operations from sheet, strip or plate steel or other metal of any desired analysis; and more particularly from relatively inexpensive carbon steel.

These and other objects may be obtained by the brake drum product, parts, elements and combinations, an embodiment of which is shown in the accompanying drawing, and is hereinafter claimed, and is described in detail, which may be stated in general terms as including in brake drum construction, an annular, generally cup-shaped one-piece sheet metal, preferably steel, drum, having a disk portion provided with one or more openings to provide an attaching wall, and an annular braking flange, said braking flange terminating in relatively narrow and relatively deep, outwardly projecting fin flanges, said fins each comprising double thickness sheet metal walls formed by reversely bending, forming or folding the metal upon itself, and said fins being integral with the brake drum disk and braking flange and one of said fins connecting between the disk and braking flange.

In the drawing.

Similar numerals refer to similar parts throughout the drawing.

Figure 1:
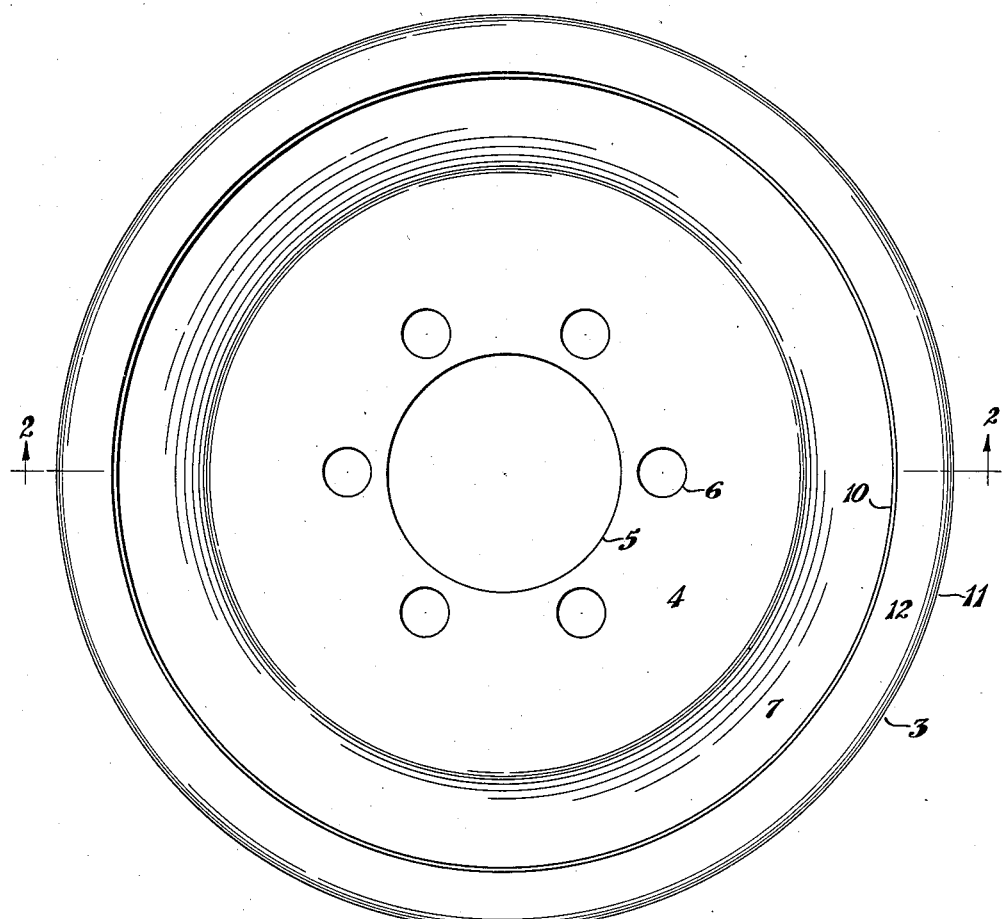
Figure 1 is a plan view of the improved brake drum construction.
Figure 2:
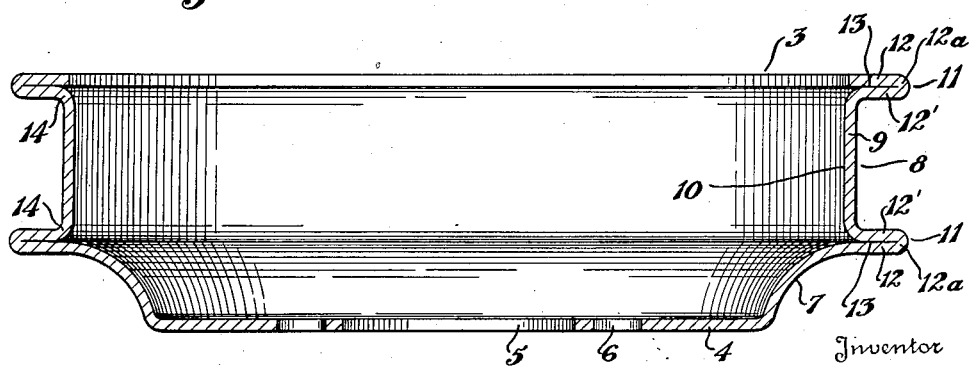
Fig. 2 is an elevation section through the improved brake drum taken on the line 2—2, Fig. 1.

The improved brake drum generally indicated at 3 includes a disk portion 4 forming an attachment wall having a central opening 5 and a series of bolt hole openings 6, by means of which the brake drum may be connected or attached in the usual manner to a vehicle wheel.

The disk portion 4 preferably terminates in a curved annular portion 7, to which is connected the braking flange generally indicated at 8. The braking flange 8 includes an annular preferably cylindrical wall 9 against the inner cylindrical surface 10 of which the usual expanding brake shoe provided with a suitable lining is frictionally engaged for accomplishing a braking operation.

Each end of the braking flange wall 9 terminates in an integral relatively narrow and relatively deep outwardly projecting double thickness radial fin flange generally indicated at 11. Each of the fins 11 preferably project outward of the braking flange wall 9 perpendicular to the axis thereof; and each fin 11 comprises two radially extended annular portions 12 and 12' which abut each other throughout their depth as indicated at 13. The annular fin portions 12 and 12' are integrally connected at their outer extremities by the curved annular portions 12a and thus form double thickness fin walls.

Likewise, each annular fin portion 12' is integrally connected at its inner extremity to the braking flange wall 9, at 14; and the annular fin portion 12 of the fin 11 closest to the disk portion 4 is integrally connected to the disk portion 4 as by being formed as a continuation of the curved portion 7 thereof.

The improved brake drum 3 may be made by usual pressing or stamping operations from sheet, strip or plate metal of any desired analysis, and preferably from sheet, strip or plate steel. In making the same, a blank may be blanked and drawn from a sheet in one operation. The blank may then be further drawn to be generally cup-shaped in a second operation. A plurality of beads may then be formed in the cup-shaped blank by a beading operation. Finally, the beaded blank may be placed in a press having a sliding contracting collar whereby the beads may be squashed to provide the terminal fins 11.

Thus, the improved brake drum comprises a one-piece pressed sheet metal construction, and the fins 11 by being relatively narrow and relatively deep and by preferably having a greater depth than width, provide a large cooling area whereby heat generated by a braking operation may be rapidly dissipated from the brake drum. Accordingly, overheating of the brake drum is prevented by the particular improved construction disclosed herein, with a consequent elimination of the other difficulties incident to overheating, which occur in prior brake drum constructions.

Moreover, the terminal relatively narrow and relatively deep fin flanges in having double thickness walls, provide a braking flange having extreme rigidity so that the same cannot become bell-mouthed, barrel-shaped, or distorted out of round, even when heated, due to most severe use of brakes on long down grades, or from any other cause.

And finally, because of its extreme rigidity, the improved brake drum may be made from comparatively light gauge metal and even from relatively inexpensive carbon steel.

Thus, the improved brake drum not only overcomes prior art difficulties, but may be fabricated very inexpensively.

I claim:—

1. In a pressed sheet metal brake drum, an annular braking flange, and an integral relatively narrow and relatively deep outwardly projecting double thickness radial fin flange at each end of the braking flange.

2. In a pressed sheet metal brake drum, an annular braking flange, an integral relatively narrow and relatively deep outwardly projecting fin at each end of the braking flange, and said fins each comprising two radially extended connected annular portions abutting throughout their depth to form a double thickness fin wall.

3. In a pressed sheet metal brake drum, a cylindrical braking flange, a relatively narrow and relatively deep fin projecting outwardly from each end of the braking flange perpendicular to the axis thereof, each fin comprising two radially extended annular portions abutting throughout their depth to form a double thickness fin wall, and one fin wall portion of each fin being integrally connected at its inner extremity to said braking flange and at its outer extremity to the other fin wall portion.

4. In one-piece pressed sheet metal brake drum construction, a disk portion provided with means for attachment to a vehicle wheel, an annular braking flange, an integral relatively narrow and relatively deep outwardly projecting fin at each end of the braking flange, and said fins each comprising two radially extended connected annular portions abutting throughout their depth to form a double thickness fin wall.

5. In pressed sheet metal brake drum construction, a disk portion attachment wall provided with openings for attachment to a vehicle wheel, a cylindrical braking flange, a relatively narrow and relatively deep fin projecting outwardly from each end of the braking flange perpendicular to the axis thereof, each fin comprising two radially extended annular portions abutting throughout their depth to form a double thickness fin wall, one fin wall portion of each fin being integrally connected at its inner extremity to said braking flange and at its outer extremity to the other fin wall portion, and one fin wall portion of one of the fins being integrally connected to the disk portion.

JACQUES STANITZ.